United States Patent [19]

Meijer

[11] 4,051,964
[45] Oct. 4, 1977

[54] DEVICES FOR COLLECTING BALES OF STRAW OR OTHER MATERIALS

[75] Inventor: Jan Gerrit Meijer, Lellens, Netherlands

[73] Assignee: Thomas Hanke Daniel Meijer, Lellens, Netherlands

[21] Appl. No.: 632,628

[22] Filed: Nov. 17, 1975

Related U.S. Application Data

[63] Continuation of Ser. No. 462,943, April 22, 1974, abandoned.

[30] Foreign Application Priority Data

Apr. 20, 1973 Netherlands ................... 7305658

[51] Int. Cl.² .................. A01D 87/12; B65G 57/32
[52] U.S. Cl. .................................. 214/152; 56/475; 198/442; 214/6 B
[58] Field of Search ............ 214/6 B, 42 A, 152; 198/31 AC, 442; 56/473.5, 474, 475, 479

[56] References Cited

U.S. PATENT DOCUMENTS

| 235,128 | 12/1880 | Cook | 198/31 AC X |
|---|---|---|---|
| 2,036,421 | 4/1936 | Luckie | 198/31 AC X |
| 2,736,159 | 2/1956 | Marshall | 56/475 |
| 2,822,659 | 2/1958 | Moore | 56/475 |
| 3,499,550 | 3/1970 | Jensen | 214/6 B |
| 3,680,717 | 8/1972 | Russ | 214/6 B |
| 3,924,757 | 12/1975 | Meyer | 214/6 B |

Primary Examiner—L. J. Paperner
Attorney, Agent, or Firm—Mason, Mason & Albright

[57] ABSTRACT

A device for collecting a number of bales whereby to form a group of bales comprises a plurality of parallel bale-collecting compartments divided into two groups, one on either side of a central longitudinal partition. The number of compartments corresponds to the number of rows to be provided in the group and the length of each compartment corresponds to the number of bales in each row. A pivotal diverter directs successive bales from a bale press to the alternate groups of compartments, and further pivotal diverters associated with the two groups distribute the bales among the compartments of that group.

3 Claims, 9 Drawing Figures

DEVICES FOR COLLECTING BALES OF STRAW OR OTHER MATERIALS

This is a continuing application of application Ser. No. 462,943 filed Apr. 22, 1974, now abandoned.

BACKGROUND OF THE INVENTION

1. Field of the Invention

The present invention relates to the collection of bales whereby to form a group of bales.

2. Description of the Prior Art

For collecting straw bales, there has been proposed a device which comprises a downwardly sloping collecting ramp linked to a straw press and a plurality of partitions, the latter defining, together with outer walls, a number of juxtaposed collecting compartments which number is equal to the number of bale rows in a group to be formed, the lengths of these compartments corresponding to the number of bales in the rows to be formed. A number of diverters are movable between two limit positions, the free extremities of these diverters being situated either at one or other side of the outlet duct of the straw press, extensions of these diverters being arranged beyond the pivot point in question so that a straw bale passing such an extension will cause the corresponding diverter to be shifted towards the other limit position. In particular such a device is provided with a hinged tail gate which is adapted to be retained in the closed position by means of reset means, and is locked in this position by a catch, which gate is opened on releasing this catch, under the weight of the bales, so that these bales are deposited on the ground in the grouping thus obtained.

In this previously proposed device, if the speed of the bales along the ramp is insufficiently high in relation to the supply speed from the straw press, it may occur that, after supplying two bales to a compartment, a third bale will arrive at the diverter in question before the diverter has been moved by the preceding bale, which will cause an obstruction at the entry of the device with the result that the device will become inoperative.

SUMMARY OF THE INVENTION

According to the present invention, there is provided in a device for collecting bales whereby to form a group of bales having a plurality of rows, a plurality of partition means, said partition means including a longitudinal median partition, said partition means defining two groups of parallel bale-collecting compartments, each located on a respective side of the median partition, the number of compartments being equal to the number of rows to be formed in the group, and the length of the compartments corresponding to the number of bales in each row, means for feeding bales into the compartments, diverter means associated with pairs of adjacent compartments, pivot means mounting said diverter means for pivotal movement between two limit positions, in one of said limit positions, the diverter means closing one of its associated compartments and opening the other of its associated compartments, and in the other of the limit positions, the diverter means opening the said one of its associated compartments and closing the other of its associated compartments, each said diverter means including extension means located beyond the pivot means and engageable by a bale passing said extension means to pivot the diverter means into its other limit positions, gate means closing the rear end of the compartments, an auxiliary diverter for pivotal movement between two limit positions at respective sides of the median plane whereby said auxiliary diverter diverts arriving bales to a respective one of said groups of compartments in each of the limit positions, said auxiliary diverter including extension means beyond its pivot means and engageable by a passing bale to move the diverter towards its other limit position.

BRIEF DESCRIPTION OF THE DRAWINGS

An embodiment of the invention will now be described, by way of example only, with reference to the accompanying diagrammatic drawings, in which:

FIGS. 3 to 5 are schematic plan views showing the device during feeding of a number of subsequent bales;

DESCRIPTION OF THE PREFERRED EMBODIMENT

Figure 1:
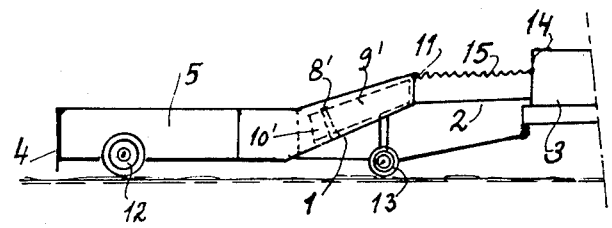
FIG. 1 is a side elevation of a collecting device in accordance with the invention.

The collecting device shown in the drawings comprises an inclined ramp 1 which is connected by means of a connecting plate 2 at its front end to a supply duct or outlet 3 of a straw press. A hinged tail gate 4 is provided at the rear end of the device. Sidewalls 5 and partitions 6 parallel thereto divide the device into a number of compartments of substantially equal width.

In the device shown in FIG. 1 no floor is present between the walls 5 and partitions 6 so that the bales fall on the ground. In an alternative arrangement, however, the device can have an inclined floor throughout its length.

Diverters 9 are connected by means of pivots 8 to the front ends of the partitions 6 at either side of a longer median partition 6'. The diverters 9, in the rest positions shown in FIGS. 2 to 4, bear against the median partition 6', and are maintained in this position by means of a spring. In their rest positions, the diverters 9 close collecting compartments defined between the median partitions 6' and the two adjacent partitions 6; further collecting compartments are defined between the partitions 6 and the side walls 5. Each diverter 9 is provided with an extension 10 which, when the diverter closes a collecting compartment in its rest position, projects into the adjacent open compartment. When a bale slides on the ramp 1 past a diverter 9 in its rest position and into the adjacent open compartment, the bale will push the extension 10 of this diverter, so that the latter is displaced, but as soon as the bale has passed the extension 10 the diverter 9 returns to its rest position. The following bale directed to this compartment is stopped by the previous bale, and remains in contact with the extension 10 so that the diverter 9 remains in its displaced position, and the subsequent bales will be directed towards the adjacent open compartment.

An auxiliary diverter 9' is mounted in front of the forward end of the median partition 6' by means of a pivot 8', and is provided with two divergent extensions 10' behind its pivot axis. Stops 11 at both sides of the connecting plate define two limit positions for the auxiliary diverter 9. The latter is always biased from the median position towards one of these limit positions, for example as shown in FIG. 1; this bias can be provided by inclining the pivot 8' rearwardly with respect to the vertical, or by means of an overcenter spring.

Figure 2:
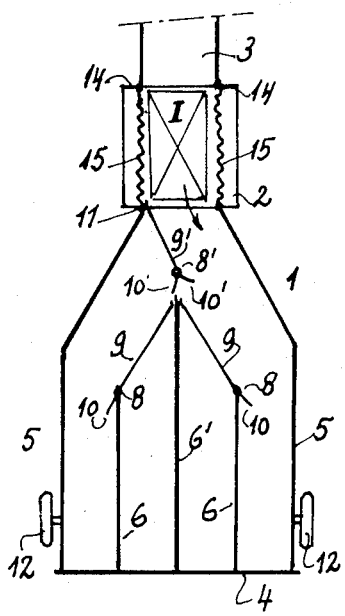
Figure 3:
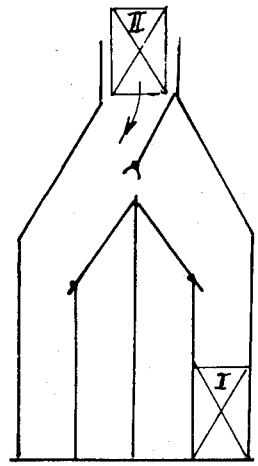
FIG. 3 is a plan view of the device, the device being shown during feeding of a first bale.

With the auxiliary diverter 9' positioned as shown in FIG. 2, the first bale I fed from the press will be directed by the auxiliary diverter 9' into the outer right-hand collecting compartment and will engage the right-hand extension 10', the latter being shaped in such a manner that, when the bale passed this extension, the auxiliary diverter 9' is moved beyond the median position, so that it will be moved by means of the bias, into the position shown in FIG. 3.

Figure 4:
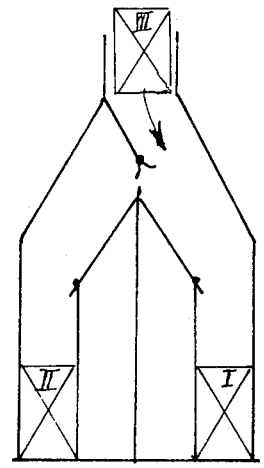
Figure 5:
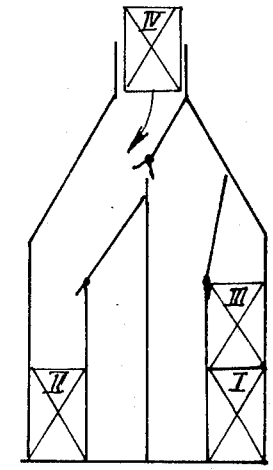

The next bale II wil then slide along the other side of the auxiliary diverter 9', and will be directed onto the outer left-hand compartment, the diverter 9' then being shifted by engagement of its left-hand extension 10' towards the position shown in FIG. 4. FIG. 5 shows the situation after the third bale III has been directed towards the outer right-hand compartment, the diverter 9 in question then being maintained in its displaced position in which it closes the outer right-hand compartment and opens the inner right-hand compartment.

Feeding of the bales continues in this manner until all the compartments have filled. In the device shown, a group of eight bales is formed when all of the compartments are full, the successive bales being positioned in the group in the order indicated in FIG. 6. As soon as all the compartments are filled, the tail gate 4 is opened, and the bales are released in the grouping shown. In the device shown the group of bales is formed directly on the ground due to the absence of a floor between the walls 5 and partitions 6, but in a device with a continuous inclined floor, the group of bales will slide downwardly to the ground with the bales positioned in the order shown in FIG. 6.

As will be apparent, the auxiliary diverter distributes successive bales alternately to the left-hand and the right-hand group of compartments with the result that a relatively large time interval is provided between successive operations of each diverter 9 whereby jamming of the diverters 9 by subsequent bales is avoided.

In the zone of the auxiliary diverter 9', the slope of the ramp 1 is such that the bales slide sufficiently quickly along the ramp to enable the diverter 9' to be shifted before the next bale arrives. The extensions 10' only need to be relatively short with the result that the bales will quickly slide past these extensions, and no obstruction will occur at this point.

In order to accelerate movement of the diverters 9', the extensions 10' are preferably formed by spring blades or projecting ends of hair-pin springs; the springs are tensioned when the front part of a bale is passing, and can relax as soon as the rear part of the bale has passed the auxiliary diverter 9', and will, then, impart an acceleration to this diverter which is sufficient to cause the diverter to move beyond its center position.

Figure 6:
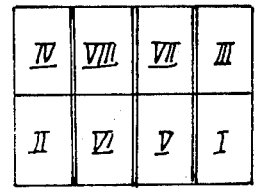
FIG. 6 is a plan view of a group of bales formed by the device.

The diverters 9 can be constructed in the same manner as the diverter 9', so that the former will have two stable limit positions and will open, in turn, one compartment and then the other compartment; in this case the order of the bales in the group will be different from that shown in FIG. 6.

When the plate 2 is situated above a pivotal coupling between the straw press and the collecting device supported on fixed rear wheels 12, which coupling, as shown in FIG. 1, is formed by a castor wheel or castor wheel assembly 13 provided with a traction bar, it is preferred to provide between fixed points 14 of the press and, for instance, the stops 11 coil springs 15 which can undergo such a length variation in curved paths that they always remain substantially taut and constitute lateral guides for the bales sliding on the plate 2. In order to prevent the bales from being damaged by these springs or from being jammed against the springs, it is preferred to surround these springs by smooth plastics hoses or the like.

In the arrangement shown in FIG. 2 it can occur that, at the moment that the next bale is supplied, the diverter 9' has not yet moved past the center point; in this event, the tip of the diverter can pierce this bale with the result that the bale and diverter are jammed. This disadvantage is avoided in the arrangement shown in FIG. 7. In this case, a pivot 16 is fixed to the front end of the diver 9' and is substantially parallel to the pivot 9'. A wing 17 is connected to the pivot 16 which is arranged in the middle of the wing 17, and an arm 18 is connected to the wing 17 or to the pivot 16, the arm 18 being perpendicular to the surface of the wing 17. The free end of the arm 18 is pivotally connected to one end of a rod 19, the other end of which is connected to a fixed pivot pin 20; the pin 20 is situated in the longitudinal median plane of the collecting device and behind the pivot 8'.

Figure 7:
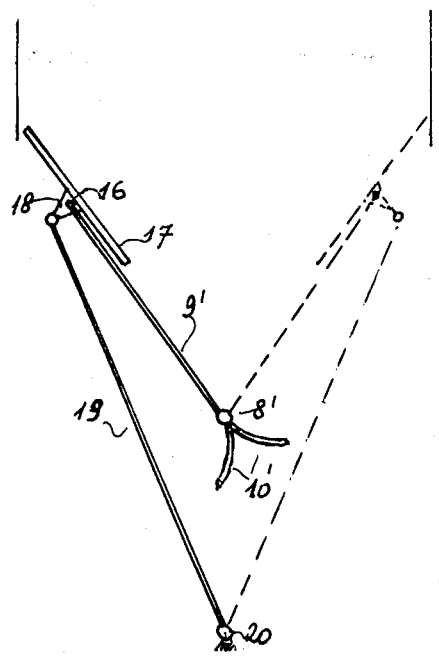
FIG. 7 is a fragmentary plan view of a modified form of auxiliary diverter of the device.

In FIG. 7 one limit position of the diverter 9' is shown in solid lines, in which position one half of the wing 17 rests against the diverter 9' or is situated in a recess of the latter. The length of the rod 19 and the position of the pivot pin 20 are such that, when the diverter 9' is moved towards the other limit position which is shown in FIG. 7 by dotted lines, the wing 17 is so rotated that the other half will rest against the diverter 9' or in the recess thereof. In the center position of the diverter 9', the wing 17 is perpendicular to the diverter. It will be clear that, if a subsequent bale arrives too early, the front surface of the bale will engage against the wing 17 whereby the wing 17 is pivoted. As soon as the diverter has passed its center position the bale will push the diverter 9' aside if this has not already been effected by the overcenter spring of the diverter.

Instead of the rod 19, any other suitable mechanism can be used for moving the wing 17, for instance a guide curve acting on the arm 18 or a pinion mounted on the pivot 16 and co-operating with a fixed rack.

Instead of using a positively rotated wing, a freely rotatable wing can be used. If a subsequent bale arrives too early, this bale will stop the wing and the pivotal movement will take place since the diverter is shifted by the preceding bale acting on one of the extensions 10'. If no subsequent bale is present, however, the wing 17 should also be rotated. This can be effected, for instance, by means of a stop pin positioned in the path of the wing, which pin, in the vicinity of the median position, causes the wing to rotate, and, if necessary an overcenter spring will ensure that the wing is always maintained in one of its limit positions.

Instead of using a plane wing as shown in FIG. 7, a roller with a round or polygonal cross-section can be rotatably mounted at the end of the diverter 9'. This roller can be freely rotatable, but, if necessary, it can also be rotated in any suitable manner in correspondence with the movement of the diverter 9'. Also a curved wing can be used instead of a plane wing for facilitating the pivotal movement.

Figure 8:
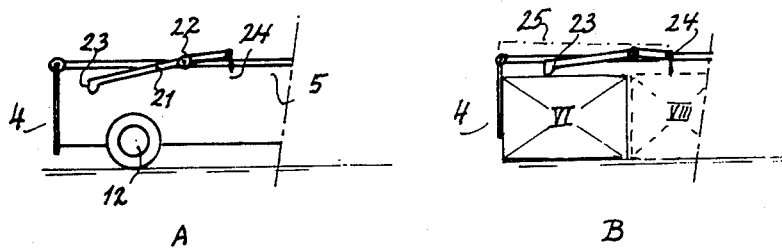
FIGS. 8A and B are fragmentary side elevations showing means for releasing a tail gate of the device.

FIG. 8 shows a mechanism for releasing the tail gate 4. This mechanism comprises a balance arm 21 supported by a pivot 22, the arm 21 being situated above the compartment in which the sixth and eighth bales, VI and VIII, are collected. In its normal position, the rear end 23 of this arm projects into this compartment, and the front end, which carries a driving finger 24, is raised out of the path of the bales. As shown in FIG. 8B, bale VI, when sliding into this compartment, will lift the rear end 23, so that the finger 24 is moved into the path of the bale VIII which, on arriving, will push the finger 24. By means of a suitable linkage 25, a catch (not shown) of by the gate 4 is then tripped, and the gate is opened. It will be clear that other mechanism may be used for this purpose if desired.

Although in the preceding description straw bales have been mentioned, it will be clear that the present device can also be used for collecting bales of other material. The invention is, furthermore, not restricted to movable devices, but can also be applied to devices having a conveyor belt.

What is claimed is:

1. A process for collecting bales into a group, said process comprising: forming a bale feed path having a downwardly inclined portion and a substantially horizontal portion downstream of said inclined portion; forming two groups of two parallel collecting compartments on the horizontal portion of the feed path, said compartments lying in a common horizontal plane, each group of compartments being located at a respective side of a central longitudinal partition and each compartment having an inlet at one end portion; providing first bale diverter means on the inclined portion of the feed path, said first diverter means being pivotal about an axis between two limit positions to divert bales to a respective one of said groups of compartments in each of the limit positions, and providing said first diverter with resilient flexible extension means downstream of said axis; providing second bale diverter means for each pair of compartments of the respective groups, said second diverter means being located on the horizontal portion of the feed path between the first diverter means and the inlet of the compartment, each said second diverter means being pivotal about an axis between two limit positions, in one of said limit positions the second diverter means opening the inlet of the outboard of its associated compartments and closing the inlet of the inboard of its associated compartments, and in the other of said limit positions, the second diverter means closing the inlet of said outboard of its associated compartments and opening the inlet of said inboard of its associated compartments, providing each said second diverter means with extension means downstream of its associated pivotal axis and biasing each said diverter means whereby it opens the inlet of its associated outboard compartment except when its correspondingg extension means bears against a bale; feeding a first bale along said path; diverting the first bale towards the first group of compartments by means of the first diverter means, said first bale pivoting the first diverter means from one of its limit positions into the other limit position as said first bale engages the flexible extension means of the first diverter means; feeding a second bale along the path; diverting the second bale towards the second group of compartments by means of the first diverter means, said second bale pivoting the first diverter means from its said other limit position into its said one limit position as the second bale engages the flexible extension means of the first diverter means; feeding further bales along the feed path such that successive bales are diverted alternately to the first and second groups of compartments by the first diverter means and each bale pivots the first diverter means into its opposite limit position as the bale engages the flexible extension means of the first diverter means; distributing the bales diverted by the first diverter means between the respective compartments of the corresponding group, said bales being distributed between the compartments by said biased diverter means such that said outboard compartments are first filled with a plurality of bales and then said inboard compartments are filled with a plurality of bales, said bales entering said outboard compartments pivoting each said biased diverter means by engaging its extension means and the last said bale of said plurality of bales received in each compartment maintaining said biased diverter means in position for filling the adjacent inboard compartment; and withdrawing the group of bales thus formed from the compartments.

2. A process in accordance with claim 1 wherein said first biased diverter means is biased by gravity.

3. A process in accordance with claim 1 wherein said second biased diverter means is biased by resilient means.

* * * * *